United States Patent [19]

Song et al.

[11] Patent Number: 5,825,438
[45] Date of Patent: Oct. 20, 1998

[54] LIQUID CRYSTAL DISPLAY HAVING DUPLICATE WIRING AND A PLURALITY OF THIN FILM TRANSISTORS FOR SINGLE PIXEL

[75] Inventors: Jun-ho Song; Dong-gyu Kim, both of Suwon, Rep. of Korea

[73] Assignee: Samsung Electronics Co., Ltd., Kyungki-do, Rep. of Korea

[21] Appl. No.: 558,708

[22] Filed: Nov. 14, 1995

[30] Foreign Application Priority Data

Nov. 14, 1994 [KR] Rep. of Korea .................. 1994 29822

[51] Int. Cl.⁶ .......................... G02F 1/136; G02F 1/1333; G02F 1/1343
[52] U.S. Cl. ................................ 349/54; 349/42; 349/139
[58] Field of Search ................................ 349/42, 139, 54

[56] References Cited

U.S. PATENT DOCUMENTS 5,446,568  8/1995  Nakazawa et al. ................ 349/42
5,517,341  5/1996  Kim et al. .......................... 349/42
5,600,461  2/1997  Ueda et al. ........................ 349/12
5,648,826  7/1997  Song et al. ........................ 349/54

*Primary Examiner*—William L. Sikes
*Assistant Examiner*—Toan Ton
*Attorney, Agent, or Firm*—Cushman Darby & Cushman IP Group of Pillsbury Madison & Sutro LLP

[57] ABSTRACT

A liquid crystal display having duplicated wiring and transistors for a single pixel. The liquid crystal display has a simple structure that each source of the transistors of a pixel is extended to form a connecting means that connects a pair of the data lines of that pixel. Each pair of data lines provides a relatively large space between each pair of two thin film transistors, which prevents the thin film transistors from being damaged by a same event.

2 Claims, 5 Drawing Sheets

LIQUID CRYSTAL DISPLAY HAVING DUPLICATE WIRING AND A PLURALITY OF THIN FILM TRANSISTORS FOR SINGLE PIXEL

BACKGROUND OF THE INVENTION (1). Field of the Invention

The present invention relates to a liquid crystal display (LCD), and more particularly to a liquid crystal display (LCD) in which duplicate wiring and a plurality of transistors are assigned to a single pixel.

(2). Description of Art

With the trend of manufacturing screens of liquid crystal displays (LCDs) having large size and high definition, decrease in LCD productivity that results from line defects or dot defects becomes an issue, and the prevention of defects is an important goal for LCD technology.

Major causes for the above-mentioned defects are characterized as the following: incomplete condition and inaccuracy of manufacturing steps of panels as designed originally, and generation of dust contaminants or insufficient cleaning of the surface.

The dot defects result from degraded picture elements such as pixels, thin film transistors and color filters. The line defects are caused by deformity of bus lines, shorts in cross-over regions, imbalance of threshold voltage of thin film transistors due to static electricity, and unstable connections with driver large scale integration (LSI).

As a third defect, display unevenness is due to uneven thicknesses of cells, alignment error of liquid crystals, time constant error, uneven dispersion or damage to the characteristics of the thin film transistors.

There are two techniques to reduce the above-described defects. One is a technique for reducing defects in the wiring or insulating region during the manufacturing steps, without changing main circuit structure, which is often used in the manufacture of liquid crystal displays having large-scale amorphous silicon thin film transistors. In concrete terms, there are a multilayer interconnection technique for precluding disconnection to reduce resistance of wiring, and a taper etching method for preventing disconnection in the intersecting points of wiring by giving a slope to the section of the wiring or multi-layered insulating film that precludes generation of pinholes and enhance insulation resisting pressure.

The above-mentioned techniques have a disadvantageous feature of increasing in the number of manufacturing steps, but have no change in the basic circuit structure, and ensure an increase in the switching rate and advantageous yield.

However, the techniques for reducing defects in the manufacturing steps cannot by themselves overcome LCD defects that may occur due to inferior thin film transistors. Accordingly, there is required redundancy of circuit structure that prevents occurrence of defects in the circuit or keeps the defects from being dominant, even if there is an inferior thin film transistor in the circuit.

Redundancy techniques are of use for removing the dot and are line defects, and classified into two kinds: a first one relating to test and modification, such as a pixel-dividing technique, a thin film transistor-duplexing and a wiring-duplexing, and a second one requiring test and modification, such as a technique for employing spare thin film transistors or spare wiring. The first one has been usually employed in present day technology.

The following description is about redundant circuit structure.

The formation of a pair of thin film transistors in a single pixel is first described.

There is a slim possibility of degrading two adjacent thin film transistors at the same time, thereby producing dot defects due to incomplete turn-on of thin film transistors. Therefore, providing a pair of thin film transistors per pixel can preclude dot defects by providing the likelihood that at least one of the transistors will not be defective.

This technique has advantages that there is no increase in the manufacturing steps and no need of modification, but increases the frequency of dot defects by leakage of thin film transistors and decreases the switching rate.

In case of forming duplicate wiring, two bus lines are assigned to one pixel or the bus lines to two pixels to preclude disconnection in bus lines. This technique also has advantages that no additional manufacturing step and modification are required. However, there is a probability of increase in the frequency of dot defects by leakage of thin film transistors and decrease in the switching rate.

When it comes to the pixel-dividing technique, a single dot is divided into a plurality of pixels, and thin film transistors are formed in each pixel. Therefore, even if one pixel is degraded, the rest of them are in a normal condition, and the dot defects are not dominant thereby.

The above-described pixel-dividing technique does not require additional manufacturing steps, but there is a decrease in the switching rate.

The three above-described techniques have respective advantages and disadvantages, and properly combine with each other in certain occasions to make up for the technical shortcomings each technique has. Using both a plurality of wiring and thin film transistors is its typical example.

An applied embodiment of that is depicted as follows with reference to FIG. 1 of the accompanying drawings.

FIG. 1 is related to the invention that is disclosed in U.S. Pat. No. 4,368,523 entitled "Liquid Crystal Display Device Having Redundant Pairs of Address Buses".

According to this conventional art, a plurality of transistors 3, 4, 5 and 6 are assigned to a single pixel, and address buses 1 and 1' and data buses 2 and 2' are formed in pair. Bridge lines 7 and 8 that connect one bus line with the other in the respective pairs of bus lines are formed to make reconditioning possible when the lines are open.

This conventional technique, however, results in disadvantages of complication of structure and manufacturing steps, and addition of production cost by the new step for forming the bridge lines to connect the bus lines of each pair with each other. Besides, the space between transistors should be narrow to prevent a decrease in the switching rate when the thin film transistors are formed in pairs. In this case, when particles having at least a predetermined size infiltrate the device, it is easy to damage the transistors.

SUMMARY OF THE INVENTION

It is an object of the present invention to provide a liquid crystal display having a simple structure to reduce generation of defects without adding any new manufacturing steps.

In order to achieve the above object, the liquid crystal display of the invention includes a plurality of pixels arranged in a matrix, a plurality of transistors connected to each of the pixels, and a pair of gate lines and a pair of data lines encompassing each of the pixels, a pair of first connecting means that connect the pair of the gate lines encompassing the one pixel, and a second connecting means that connects the pair of the data lines encompassing the one pixel. The second connecting means is formed by extending the sources of the transistors, and the number of the transistors is two.

As another aspect of the present invention, a liquid crystal display panel including a plurality of pixels arranged in a matrix, a plurality of transistors connected to each of the pixels, and a pair of gate lines and a pair of data lines encompassing each of the pixels, further comprises a first connecting means that connects the pair of the gate lines encompassing the one pixel, and a second connecting means that connects the pair of the data lines encompassing the one pixel. The second connecting means is formed by extending the sources of the transistors.

In the liquid crystal display of the invention, a pair of common electrode lines are formed in parallel with the gate lines. Preferably, the pair of common electrode lines are formed on both sides of the pixel.

The pair of the gate lines are formed on one side of the pixel, and the number of the transistors is two.

BRIEF DESCRIPTION OF THE DRAWINGS

The above objects and other advantages of the present invention will become more apparent upon consideration of presently preferred embodiments of the present invention with reference to the attached drawings, in which.

DETAILED DESCRIPTION OF THE PREFERRED EMBODIMENTS

Preferred embodiments of the present invention will now be discussed in detail, with reference to the accompanying drawings.

Figure 1:
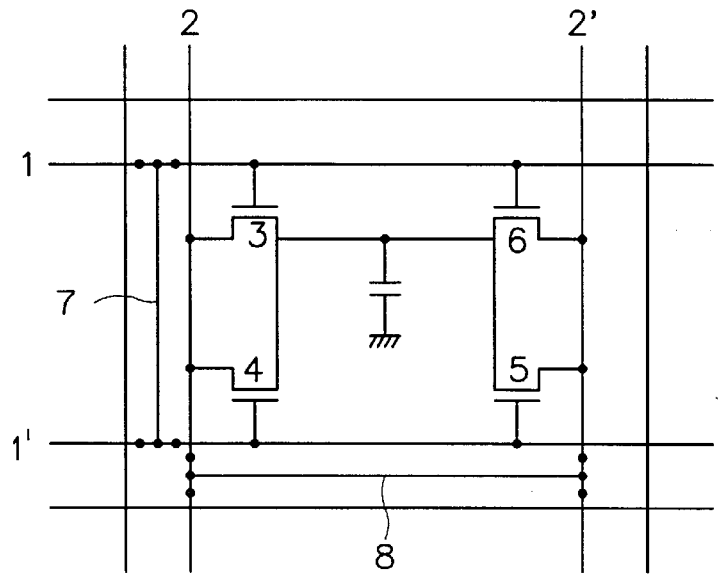
FIG. 1 is an equivalent circuit diagram of a conventional liquid crystal display that includes double wirings and transistors for a single pixel.
Figure 3:
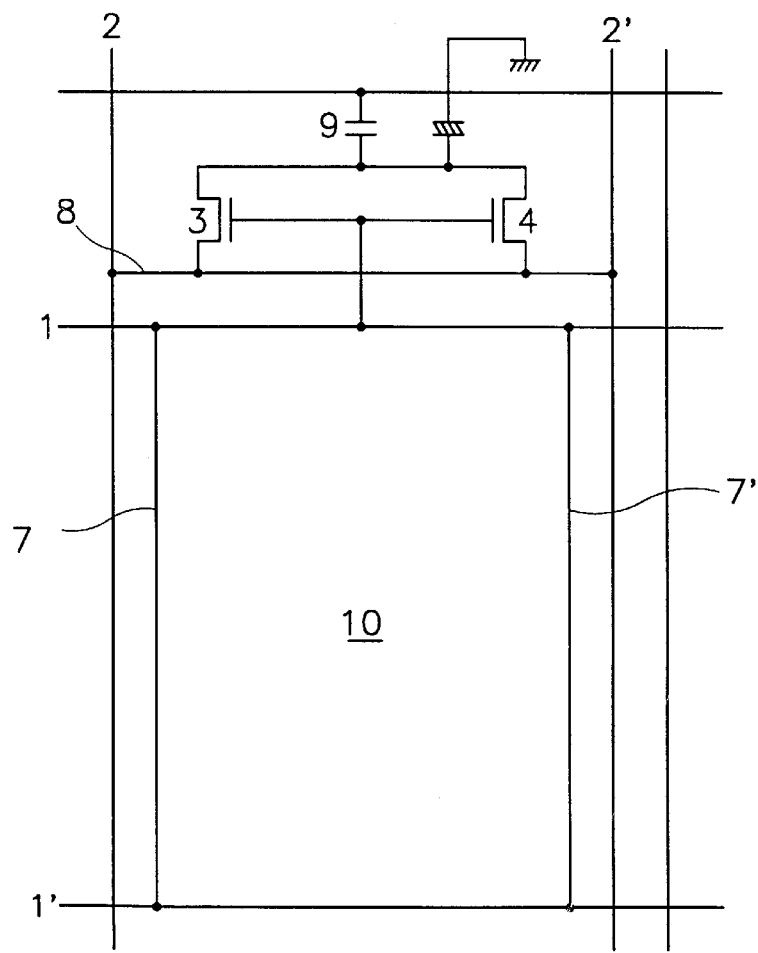
FIG. 3 is an equivalent circuit diagram of the liquid crystal display of FIG. 2.
Figure 2:
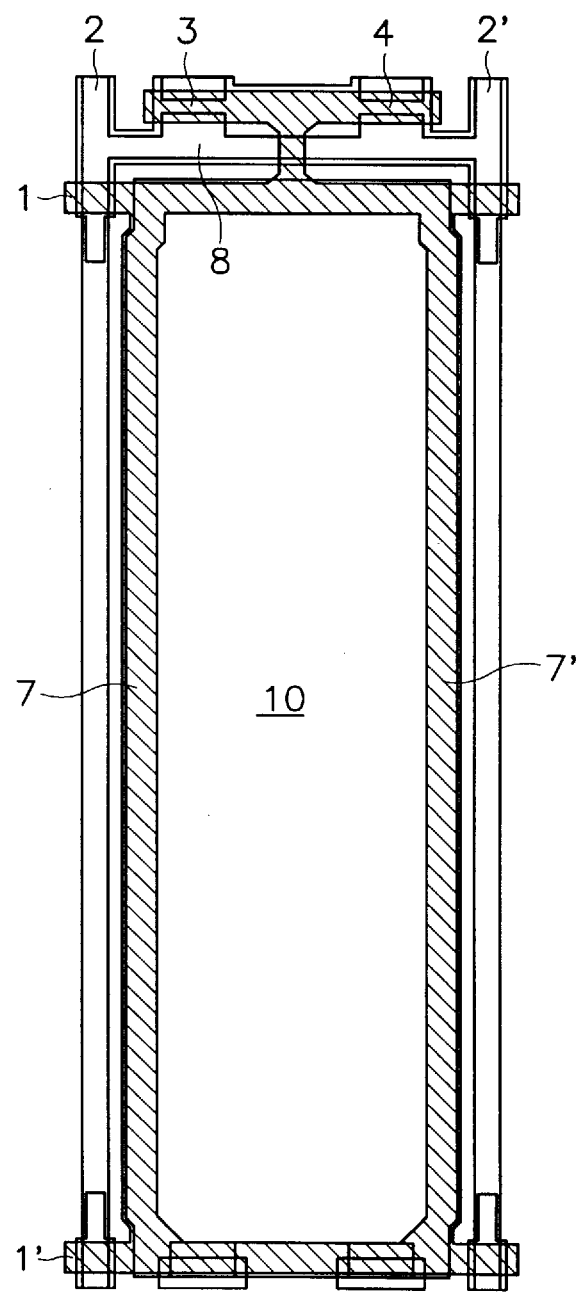
FIG. 2 is a top-perspective view of a liquid crystal display in accordance with a first preferred embodiment of the present invention.

FIG. 2 is a top-perspective view of a liquid crystal display in accordance with a first preferred embodiment of the present invention, and FIG. 3 is an equivalent circuit diagram of the liquid crystal display of FIG. 2.

As shown in FIGS. 2 and 3, the liquid crystal display of the first preferred embodiment includes a pair of gate lines 1 and 1' and a pair of data lines 2 and 2' collectively encompassing each pixel 10 that is arranged in a matrix.

The pair of the gate lines 1 and 1' of one pixel are connected with each other bordering two opposite margins of the pixel by means of respective connecting means 7 and 7', and the pair of the data lines 2 and 2' of one pixel are connected with each other by one connecting means 8. The connecting means 7 and 7' and gate lines 1 and 1' overlap the pixel 10 and an insulating layer (not illustrated). The overlap area becomes a storage capacitor 9 to form an auxiliary capacitance. Such an auxiliary capacitance reduces a drop in data voltage generated in the leakage current until the next data signal arrives after one data signal has arrived. When gate lines of all pixels are connected to the auxiliary capacitance, the potential of the foregoing stage is applied just when the data is recorded, and it becomes a bottom potential from when the data of the next stage is recorded, and even if the auxiliary capacitance is connected to the foregoing stage, it serves as a storage capacitor.

Besides, two thin film transistors 3 and 4, switching elements to the pixel 10, are formed, and the space between two transistors is larger than the one that is conventionally provided when only one transistor is provided. Since the data lines 2 and 2' are duplicates, the space between the transistors can be larger without affecting adversely the switching rate.

The gate lines of these two transistors are connected with one another, and an intermediate point of the trace connecting the gates is connected with the gate line 1. The sources of the two transistors are extended to form a connecting means 8 that connects the data lines 2 and 2' with one another, and each drain is connected to the storage capacitors 9.

The lined storage capacitors 9 represented by the one shown in FIG. 3, are capacitors that are filled with liquid crystal between the pixel 10 and common electrodes formed on the other plate of the liquid crystal display (not shown).

Figure 4:
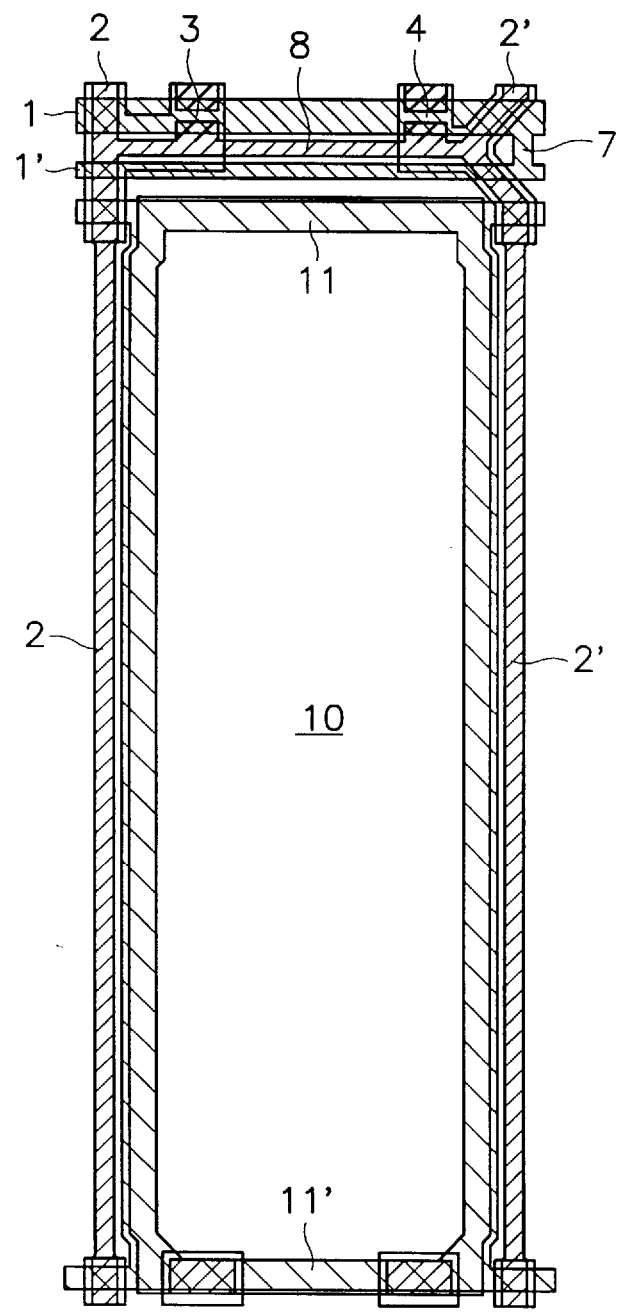
FIG. 4 is a top-perspective view of a liquid crystal display in accordance with a second preferred embodiment of the present invention.
Figure 5:
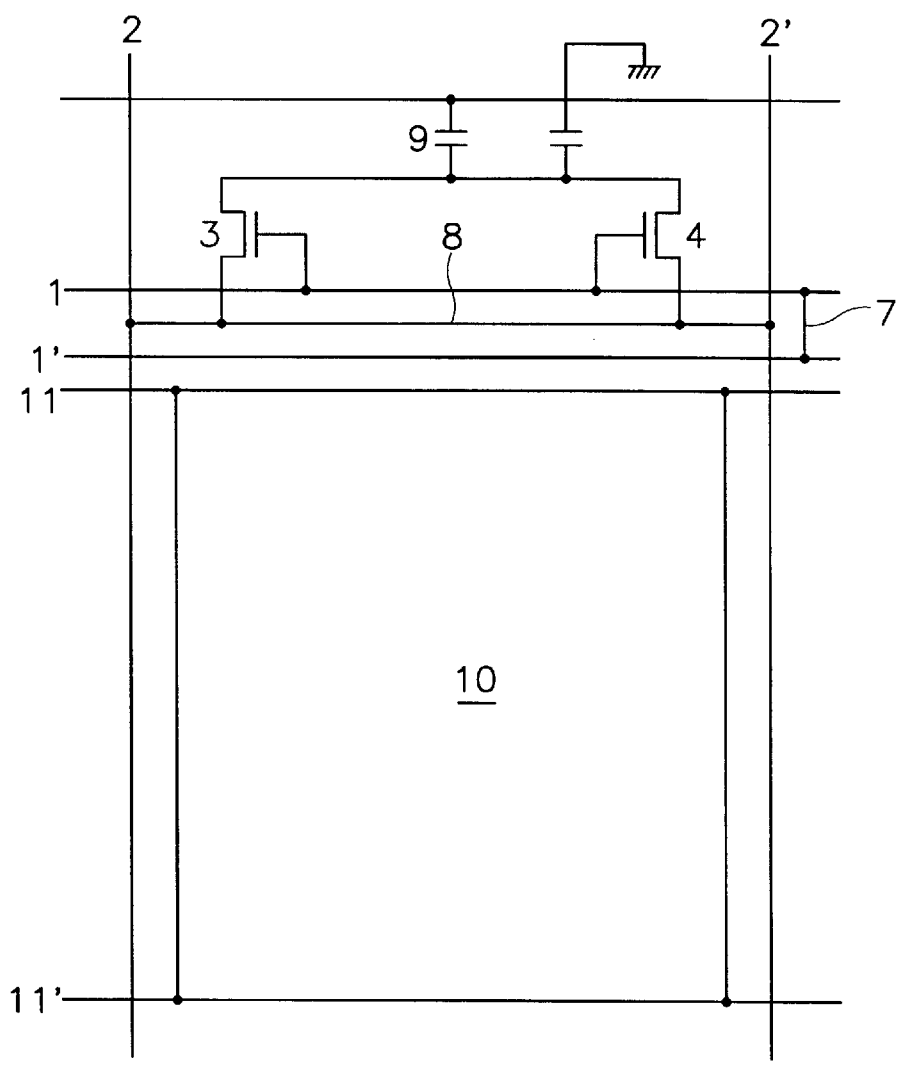
FIG. 5 is an equivalent circuit diagram of the liquid crystal display of FIG. 4.

FIG. 4 is a top-perspective view of a liquid crystal display in accordance with a second preferred embodiment of the present invention, and FIG. 5 is an equivalent circuit diagram of the liquid crystal display of FIG. 4.

As shown in FIGS. 4 and 5, a liquid crystal display of a second preferred embodiment includes a pair of gate lines 1 and 1' and a pair of data lines 2 and 2' encompassing each pixel 10 that is arranged in a matrix (not shown). In contrast to the first preferred embodiment in which the gate lines are formed on both sides of the single pixel, the pair of the gate lines 1 and 1' are both formed on a same one side of the pixel, i.e., on either the upper or lower side of the pixel (assuming a vertical orientation of the display having the array of such pixels). In addition, the pair of the common electrode lines 11 and 11' are arranged in parallel with each gate line 1 and 1' on the lower and upper margins of the pixel.

The pair of the gate lines 1 and 1' of one pixel are connected with each other by one connecting means 7', and the pair of the data lines 2 and 2' of one pixel are connected with each other by one connecting means 8.

Thin film transistors 3 and 4, switching elements for the pixel 10, are formed to have a space therebetween which is larger than the spaces conventionally provided at comparable locations. As mentioned above in connection with describing the first preferred embodiment, because the data lines 2 and 2' are duplicates, the space between the transistors can be larger without affecting adversely the switching rate.

The gates of the two transistors are connected to a gate line 1. The sources of the two transistors are extended to form a connecting means 8 that connects the data lines 2 and 2, and the drains are connected to a storage capacitor 9.

In the liquid crystal display of the present invention, the data lines are duplicate to make it possible to enlarge the space of the transistors, comparable with conventional construction which prevents the thin film transistors from being damaged at the same time.

The following description is about the operation of a liquid crystal display when the wiring is disconnected by particles of a predetermined size.

Figure 6:
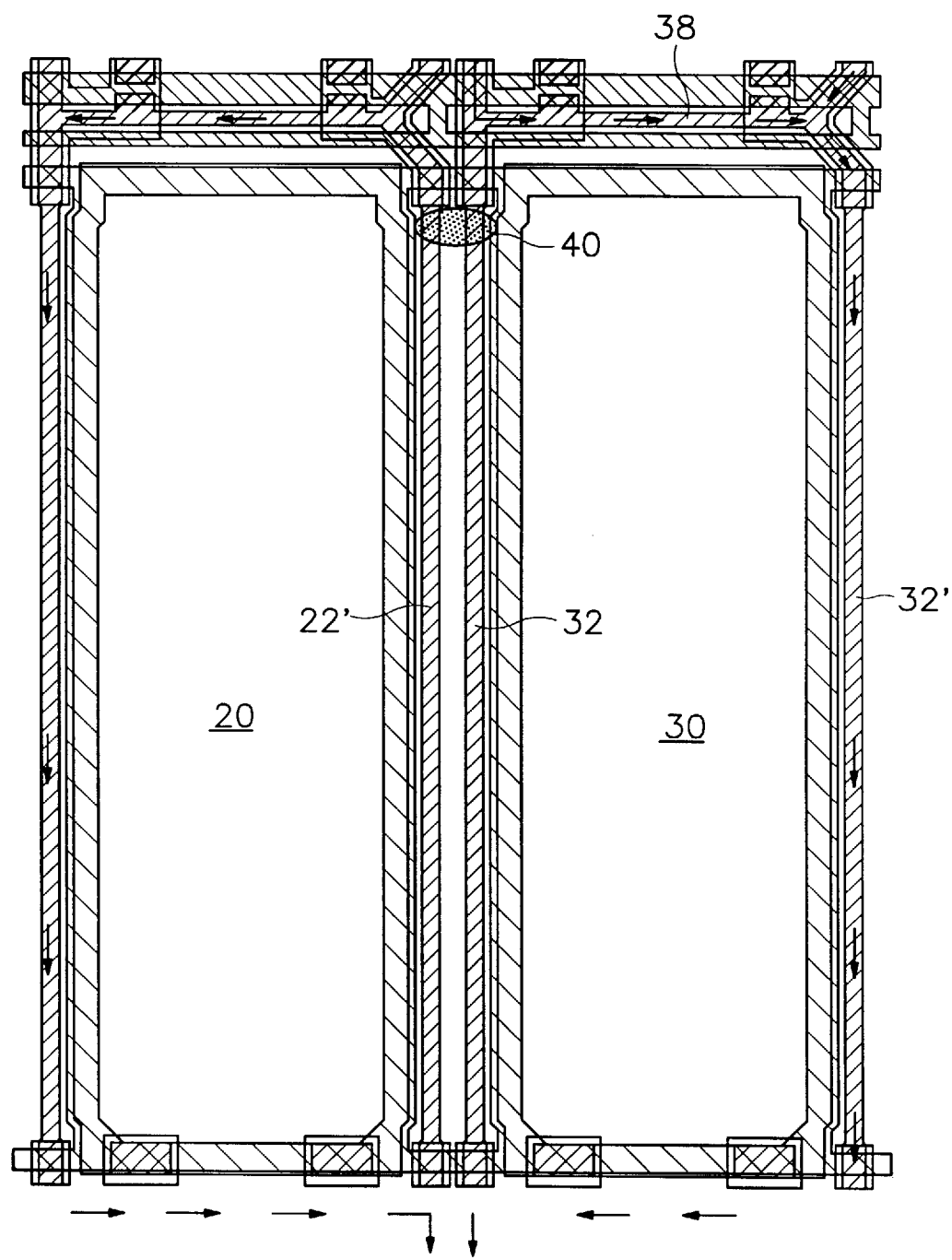
FIG. 6 depicts signal flow when the wiring is disconnected by particles of a predetermined size in the liquid crystal display of the invention.

As shown in FIG. 6, when a particle 40 that is larger than the space between the adjacent data lines 22' and 32 of the two pixels 20 and 30 is pervious to the LCD, the two data lines 22' and 32 would ordinarily both be damaged. However, the data lines in a display constructed in accordance with the principles of the present invention are connected overall, and signals can be transmitted in the direction of arrows as shown in FIG. 6. In case of the right pixel of FIG. 6, a signal that has come down along the left data line 32, does not move down along the damaged data line 32, and, instead, is transmitted along the right data line 32' via the connecting means 38 that connect the data lines 32 to 32'.

Accordingly, the LCD of the invention can operate normally regardless of the damage to the data lines.

The LCD of the present invention has a simple structure that in which each source of the transistors is extended to form a connecting means that connects a pair of the data lines to one pixel, dispensing with any additional manufacturing step, and includes duplicated data lines to permit the provision of a space between the two thin film transistors of each pixel, thereby preventing the thin film transistors from being both damaged by the same event.

The preferred embodiments of the present invention are given by way of example, and the invention recited in the attached claims is not limited to the illustrative embodiments. Those of ordinary skill in the art will recognize that routine design changes may be made to the exemplary embodiments without departing from the scope of the claims.

What is claimed is:

1. A liquid crystal display, comprising:

a plurality of pixels arranged in a matrix;

a plurality of transistors connected to each of said pixels, each said transistor having a source;

a respective pair of gate lines and a respective pair of data lines encompassing each of said pixels;

a respective pair of first connecting means that connect the pair of gate lines encompassing each said pixel; and a respective second connecting means that connects the pair of data lines encompassing each said pixel, said second connecting means being formed by extensions of said sources of said transistors.

2. The liquid crystal display panel as set forth in claim 1, wherein:

said plurality of said transistors is two.

* * * * *